April 4, 1944.  E. C. WINK  2,345,847
REEL LOCKING DEVICE
Filed Aug. 31, 1942
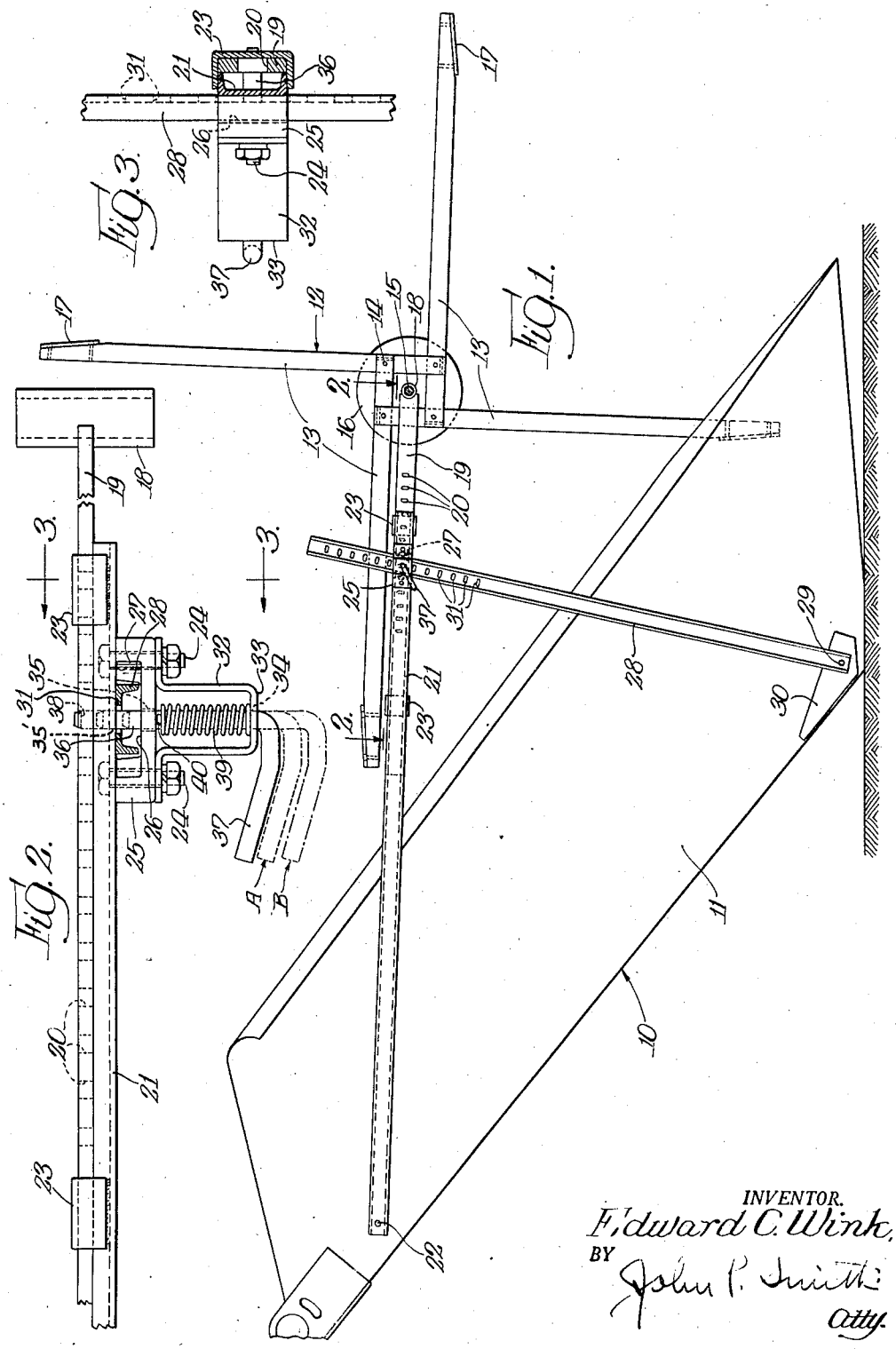
INVENTOR.
Edward C. Wink,
BY Patented Apr. 4, 1944

2,345,847

UNITED STATES PATENT OFFICE 2,345,847

REEL LOCKING DEVICE

Edward C. Wink, Battle Creek, Mich., assignor to Oliver Farm Equipment Company, a corporation of Delaware Application August 31, 1942, Serial No. 456,841

1 Claim. (Cl. 56—221)

The present invention relates generally to a harvester reel, but more particularly to a locking mechanism whereby the reel may be adjusted horizontally and vertically with respect to the cutting mechanism of the harvester and locked in its various positions of adjustment.

One of the primary objects of the present invention is to provide a novel and improved locking mechanism in which a single latch member forms the locking means for adjustably supporting the reel in various positions when it has been adjusted horizontally and vertically with respect to the associated cutting mechanism.

A still further object of the invention is to provide a novel and improved reel locking mechanism in which a single spring actuated latch locks the horizontal and vertically extending supporting members of the reel with respect to the cutting mechanism.

These and other objects are accomplished by providing a construction and an arrangement of the various parts in the manner hereinafter described and particularly pointed out in the appended claim.

Referring to the drawing:

Fig. 1 is a fragmentary side elevational view of a harvester and reel showing my improved invention embodied therein;

Fig. 2 is an enlarged fragmentary cross sectional view taken on the line 2—2 in Fig. 1; and Fig. 3 is a fragmentary cross sectional view taken on the line 3—3 in Fig. 2.

In illustrating one application of my improved invention, I have shown the same in connection with a harvester, a fragmentary portion of which is shown in Fig. 1 of the drawing. In this view the inclined elevator frame is generally indicated by the reference character 10. The elevator frame 10 in this instance comprises a vertically extending divider or frame member 11. Positioned forwardly of the elevator frame 10 is the usual revolving reel generally indicated by the reference character 12. The reel in this instance comprises right angularly projecting arms 13 which have their inner ends secured together by means of bolts 14. These bolts 14 may be connected to a spider 16 which in turn is secured to a reel shaft 15. Secured to the outer ends of the arms 13 are the usual reel bats 17. One end of the shaft 15 is journaled in a bearing 18 which in turn is secured to the forward end of a longitudinally adjustable bar 19. An intermediate portion of the bar 19 is provided with a plurality of uniformly spaced apertures 20. Extending parallel to the bar 19 is a channel member 21 which has its rear end as shown at 22 pivoted adjacent the upper end of the elevator frame member 11. The bar 19 is longitudinally adjusted with respect to the channel member 20 by means of U-shaped guide brackets 23 which have their upper and lower ends welded or otherwise secured to the member 21 as clearly shown in Figs. 2 and 3 of the drawing. Secured adjacent the forward end of the member 21 by means of bolts 24 is a bracket 25 which has a vertically extending recess as shown at 26. The forward and rearward walls on the upper and lower sides thereof are diverging as shown at 27 so as to freely and adjustably receive a vertical reel supporting bar 28. The bar 28 is channel shape in cross section and has its lower end pivoted, as shown at 29, to a bracket 30, which in turn, is secured to the elevator frame member 11. The upper end of the bar 28 is provided with a plurality of uniformly spaced apart apertures as shown at 31. Secured to the bracket 25 by means of the bolts 24 is a substantially U-shaped bail 32. The bail 32 is provided with a vertically extending portion 33 which in turn is provided with an aperture 34. The aperture 34 is in alignment with an aperture 35 in the bracket 25 so that both receive a locking pin 36. Located in alignment with the apertures 34 and 35 is an aperture 35' in the member 21. The locking pin 36 has a substantially right-angularly bent handle 37 to provide a grip for withdrawing the locking portion of the pin from the apertures of the supporting bars 19 and 28 in the manner hereinafter described. The inner end of the locking pin is tapered as shown at 38 to facilitate the entrance of the pin in the apertures. The locking pin is normally pressed inwardly by a spring 39 which embraces the intermediate portion 10 of the pin. One end of the spring 39 engages the inner side of the vertical portion 33 of the bail 32 and the other end thereof engaging a transverse cotter pin 40 carried by the pin 36.

Summarizing the advantages and function of operation of my improved reel locking device, it will be observed that should the operator desire to adjust the reel horizontally with respect to the elevator frame or cutting mechanism, the handle 37 of the pin 36 may be gripped and withdrawn to broken line "A" position, thereby withdrawing the inner end of the pin from the apertures 20 in the bar 19, freeing the bar 19 from the pin so that it may be adjusted forwardly or rearwardly in the guides 23 with respect to the bar or arm 21. Should the operator desire to adjust the reel vertically, the gripping portion 37 of the pin 35 may be withdrawn to the "B" position, thereby withdrawing the inner end of the pin, not only from the aperture 20 in the bar 19, but also from the aperture 31 and the bar 28 so that the reel may be adjusted horizontally as well as vertically and when the proper horizontal and vertical position has been secured and the apertures brought into alignment, the pin may be released to lock the reel in various positions of adjustment. With this arrangement obviously the single locking pin forms the locking means for supporting the reel for horizontal as well as vertical adjustment.

While in the above specification I have described one embodiment which my invention may assume in practice, it will of course be understood that the same is capable of modification and that modification may be made without departing from the spirit and scope of the invention as expressed in the following claim.

What I claim as my invention and desire to secure by Letters Patent is:

A locking device for a harvester reel comprising in combination, a frame, a reel, a substantially horizontally extending member pivoted at one end to said frame, an extensible reel supporting bar carried by said first named member, a substantially vertically extending member pivoted at one end to said frame, there being perforations in said members and bar, a bracket secured to said first named member and slidably receiving said second named member and a single locking pin carried by said bracket and adapted to engage the apertures in said members and bar for locking said reel in various positions of adjustment.

EDWARD C. WINK.